（12）United States Patent
Altaf et al.

(10) Patent No.: US 10,572,826 B2
(45) Date of Patent: Feb. 25, 2020

(54) SCALABLE GROUND TRUTH DISAMBIGUATION

(71) Applicant: INTERNATIONAL BUSINESS MACHINES CORPORATION, Armonk, NY (US)

(72) Inventors: Faheem Altaf, Pflugerville, TX (US); Lisa Seacat Deluca, Baltimore, MD (US); Raghuram Srinivas, McKinney, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/490,081

(22) Filed: Apr. 18, 2017

(65) Prior Publication Data

US 2018/0301141 A1    Oct. 18, 2018

(51) Int. Cl.
*G06F 17/00* (2019.01)
*G06N 20/00* (2019.01)

(52) U.S. Cl.
CPC .................................. *G06N 20/00* (2019.01)

(58) Field of Classification Search
CPC .... G06F 15/005; G06F 15/22; G06F 15/1815; G06F 15/063; G06F 17/21; G06F 17/2785; G06F 17/30268; G06F 17/30864; G06F 17/30867; G06F 17/30734; G06F 17/2705; G06F 17/3053; G06F 17/30528; G06F 17/30876; G06F 17/271; G06F 17/277;

(Continued)

(56) References Cited

U.S. PATENT DOCUMENTS 6,240,384 B1 *    5/2001    Kagoshima ............. G10L 13/07
                                                         704/220
7,409,336 B2 *    8/2008    Pak ...................... G10L 15/1822
                                                           704/9

(Continued)

FOREIGN PATENT DOCUMENTS

WO        02073530 A1    9/2002
WO        03069554 A2    8/2003

(Continued)

OTHER PUBLICATIONS

"Selecting the Refinement Configuration", Oracle ATG Web Commerce, [retrieved on Jan. 13, 2017]. Retrieved from the Internet: < URL:https://docs.oracle.com/cd/E24152_01/Search.10-1/ATGSearchQueryRef/html/s1007selectingtherefinementconfigurat01.html >, 2 pgs.

(Continued)

*Primary Examiner* — Abdelali Serrou
(74) *Attorney, Agent, or Firm* — Isaac J. Gooshaw, Esq.; George S. Blasiak, Esq.; Heslin Rothenberg Farley & Mesiti PC

(57) ABSTRACT

Methods, computer program products, and systems are presented. The methods include, for instance: obtaining an utterance input from a user agent, and collecting context data of the utterance input. A context tag is generated based on the context data, and one or more ground truth having respective utterance semantically identical to the utterance input is selected. Semantical relationship between the context tag and an intent of the selected ground truth is examined and the selected ground truth is updated with the context tag.

19 Claims, 5 Drawing Sheets

(58) Field of Classification Search
CPC ............... G06F 17/28; G06F 17/3043; G06F 17/30595; G06F 17/30598; G06F 17/30654; G06F 17/3066; G06F 17/30663; G06F 17/30684; G06F 17/3097; G06F 19/00; G06F 19/325; G06F 17/30675; G06F 17/30893; G06F 17/274; G06F 17/2809; G06F 17/2881; G06F 17/30011; G06F 17/30616; G06F 17/30619; G06F 17/3069; G06F 17/30696; G06F 2216/11; G06F 17/30017; G06F 17/30321; G06F 17/30424; G06F 17/30613; G06F 17/30625; G06F 17/30719; G06F 17/30923; G06F 17/30994; G06F 8/34; G06F 15/16; G06F 15/80; G06F 15/8053; G06F 17/30029; G06F 17/30038; G06F 17/30371; G06F 17/30542; G06F 17/3064; G06F 17/3089; G06F 17/30899; G06F 17/30958; G06F 17/5009; G06F 8/316; G06F 8/38; G06F 8/40; G06F 9/30; G06F 9/30054; G06F 9/30076; G06F 9/30101; G06F 9/3012; G06F 9/355; G06F 9/3552; G06F 9/3853; G06F 9/3887; G06F 9/3891; G06F 9/4448; G06F 9/451; G06F 9/454; G06F 17/211; G06F 17/218; G06F 17/241; G06F 17/30401; G06F 17/30554; G06F 17/30705; G06F 17/30722; G06F 17/30882; G06F 17/30887; G06F 17/30902; G06F 17/30976; G06F 17/30997; G06F 21/552; G06F 21/577; G06F 3/011; G06F 3/013; G06F 8/10; G06F 8/20; G06F 8/35; G06F 8/36; G06F 9/452; G06F 9/453; G06F 9/542; G06F 16/10; G06F 17/27; G06F 16/00; G10L 15/265; G10L 13/00; G10L 13/08; G10L 15/01; G10L 15/02; G10L 15/06; G10L 15/14; G10L 15/1822; G10L 15/26; G10L 15/28; G10L 15/30; G10L 15/32; G10L 17/00; G10L 21/06; G10L 15/00; G10L 15/08; G10L 15/183; G10L 15/22; G06N 20/00

See application file for complete search history.

(56) References Cited

U.S. PATENT DOCUMENTS

| | | | |
|---|---|---|---|
| 7,840,589 B1 | | 11/2010 | Holt et al. |
| 9,317,608 B2 | * | 4/2016 | Hess .................... G06F 16/951 |
| 9,465,862 B2 | * | 10/2016 | Agrawal ................ G06N 7/005 |
| 9,558,740 B1 | | 1/2017 | Mairesse et al. |
| 9,772,994 B2 | * | 9/2017 | Karov ................. G06F 17/2785 |
| 10,282,389 B2 | | 5/2019 | Liang et al. |
| 2004/0044661 A1 | | 3/2004 | Allen |
| 2007/0033531 A1 | * | 2/2007 | Marsh .................... G06Q 30/02 715/738 |
| 2007/0078850 A1 | * | 4/2007 | Aziz ................... G06Q 30/0603 |
| 2008/0114755 A1 | * | 5/2008 | Wolters ................. G06F 16/954 |
| 2008/0270138 A1 | * | 10/2008 | Knight ............. G06F 17/30026 704/260 |
| 2009/0234647 A1 | * | 9/2009 | Scholz .................... G10L 15/30 704/235 |
| 2010/0082583 A1 | * | 4/2010 | Chang ............. G06F 17/30616 707/706 |
| 2010/0083173 A1 | * | 4/2010 | Germann .......... G06F 17/30997 715/810 |
| 2012/0066253 A1 | * | 3/2012 | Osborn .............. G06Q 30/0201 707/769 |
| 2012/0095991 A1 | | 4/2012 | Ferrari et al. |
| 2012/0158685 A1 | * | 6/2012 | White ................. G06F 16/9535 707/706 |
| 2012/0226681 A1 | | 9/2012 | Paparizos et al. |
| 2013/0006914 A1 | * | 1/2013 | Ray ..................... G06F 16/9535 706/50 |
| 2013/0132236 A1 | | 5/2013 | Gokturk et al. |
| 2014/0101146 A1 | * | 4/2014 | Scriffignano ...... G06F 16/24578 707/728 |
| 2014/0173602 A1 | * | 6/2014 | Kikin-Gil ............ G06Q 10/109 718/100 |
| 2014/0201647 A1 | | 7/2014 | Scherpa et al. |
| 2014/0229467 A1 | | 8/2014 | Roseman et al. |
| 2014/0258277 A1 | | 9/2014 | Cheng et al. |
| 2014/0278986 A1 | * | 9/2014 | Rouse ................ G06Q 30/0256 705/14.54 |
| 2014/0297267 A1 | * | 10/2014 | Spencer ................ G06F 17/276 704/9 |
| 2014/0316764 A1 | * | 10/2014 | Ayan ....................... G10L 15/24 704/9 |
| 2014/0358889 A1 | * | 12/2014 | Shmiel ................ G06F 17/2745 707/710 |
| 2015/0066711 A1 | | 3/2015 | Chua et al. |
| 2015/0242441 A1 | | 8/2015 | Ramesh et al. |
| 2016/0034512 A1 | * | 2/2016 | Singhal ............. G06F 17/30705 707/737 |
| 2016/0034514 A1 | * | 2/2016 | Singhal ............. G06F 17/30867 707/706 |
| 2016/0063993 A1 | | 3/2016 | Dolan et al. |
| 2016/0098645 A1 | | 4/2016 | Sharma et al. |
| 2016/0125048 A1 | * | 5/2016 | Hamada ............ G06F 17/30401 707/734 |
| 2016/0140643 A1 | | 5/2016 | Nice et al. |
| 2016/0163312 A1 | * | 6/2016 | Henton .................... G10L 15/22 704/270.1 |

FOREIGN PATENT DOCUMENTS

| | | |
|---|---|---|
| WO | 2009117835 A1 | 10/2009 |
| WO | 2012067586 A1 | 5/2012 |

OTHER PUBLICATIONS

Mell, Peter, et al., "The NIST Definition of Cloud Computing", NIST Special Publication 800-145, Sep. 2011, Gaithersburg, MD, 7 pgs.

\* cited by examiner

SCALABLE GROUND TRUTH DISAMBIGUATION

TECHNICAL FIELD

The present disclosure relates to web content processing, and more particularly to methods, computer program products, and systems for constructing training data to be utilized in efficiently classifying natural language utterances.

BACKGROUND

Conventionally, a natural language classifier is trained by use of machine learning and rules engines to resolve disambiguation with intents associated with same utterances of a query.

SUMMARY

The shortcomings of the prior art are overcome, and additional advantages are provided, through the provision, in one aspect, of a method. The method for disambiguating training data in natural language classification includes, for example: obtaining, by one or more processor of a computer, an utterance input from a user agent; collecting, by the one or more processor, context data of the utterance input from the user agent, wherein the context data describes circumstances of the utterance input; generating, by the one or more processor, a context tag of one or more context tag based on the context data, wherein the one or more context tag corresponds to the utterance input; selecting, by the one or more processor, one or more ground truth from the training data by use of the utterance input and the context tag, wherein each of the one or more ground truth respectively includes an utterance and an intent, wherein the utterance of each ground truth is semantically identical to the utterance input, and wherein the intent of each ground truth is semantically consistent with the context tag; and updating, by the one or more processor, the one or more ground truth by attaching the context tag.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
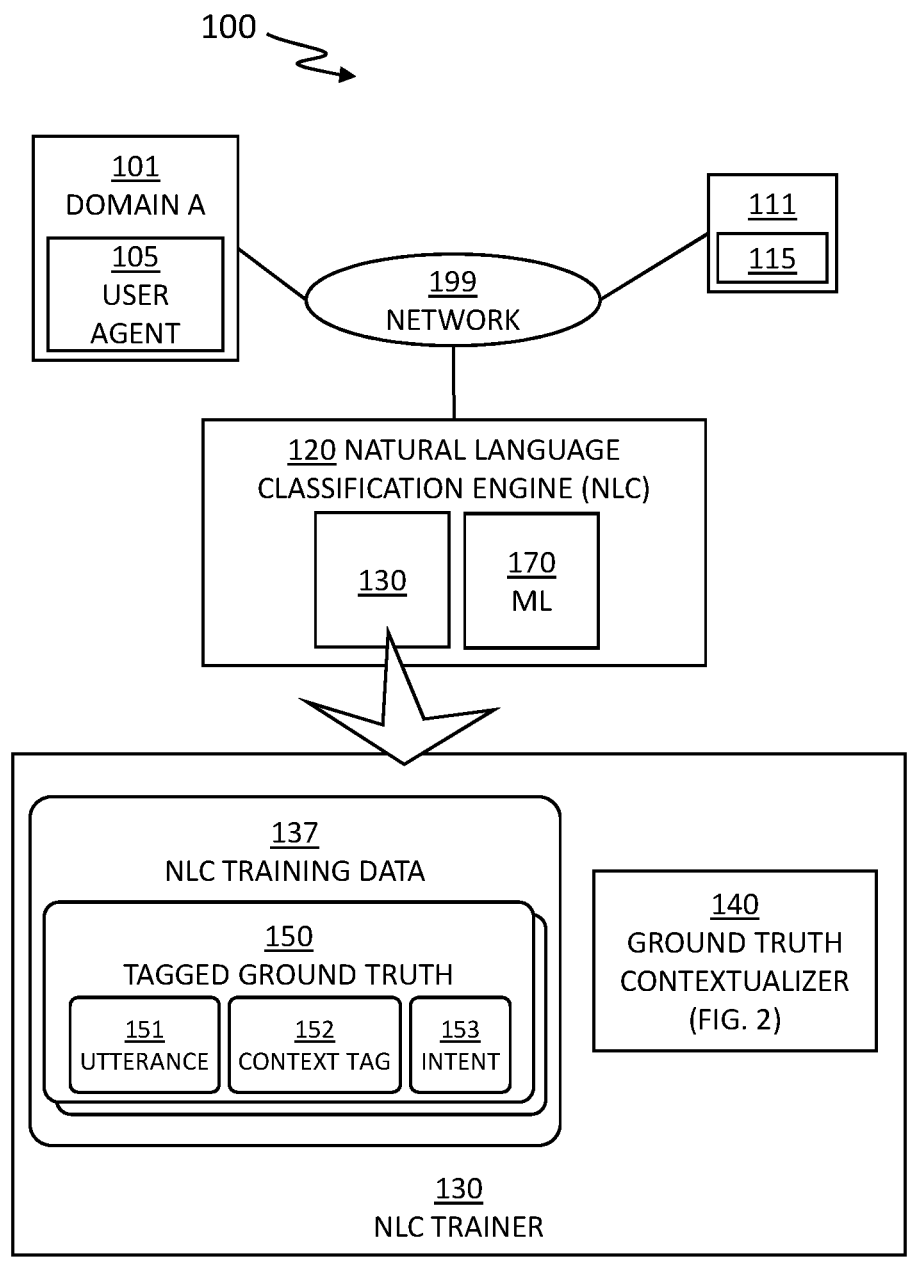
FIG. 1 depicts a system for enhancing ground truth by context tagging, in accordance with one or more embodiments set forth herein.

FIG. 1 depicts a system 100 for enhancing ground truth by context tagging, in accordance with one or more embodiments set forth herein.

The system 100 includes one or more domain 101, 111 that is coupled to a natural language classification engine (NLC) 120 via a network 199. Domain A 101 of the one or more domain 101, 111, includes a user agent 105 that communicates with users of the domain A 101 by use of a natural language. The user agent 105 receives a spoken and/or written request to the domain A 101 from one of the users and forwards the request to the NLC 120. Examples of the one or more domain 101, 111 may be, but are not limited to, a retail website having many departments and/or items that may not be properly classified by utterances alone, etc. Examples of the user agent 105 may be, but are not limited to, a digital virtual assistant, a chat bot, etc. The NLC 120 responds to the request by use of a NLC trainer 130 and a machine learning process 170.

The NLC trainer 130 includes a ground truth contextualizer 140 and NLC training data 137. The ground truth contextualizer 140 tags one or more ground truths of the NLC training data 137 with respective context tags such that the NLC 120 may distinguish one context from another context of utterances, wherein the same utterance is used in more than one distinctive contexts. Detailed operations of the ground truth contextualizer 140 are presented in FIG. 2 and corresponding description.

The NLC training data 137 is used to train natural language classification model models utilizing the context tags. Our invention describes the use of context parameters to be used in the building the natural language classification model or to aid in the machine learning of the natural language classification model. The NLC training data 137 includes one or more tagged ground truth. In certain embodiments of the present invention, the NLC trainer 130 generates the one or more ground truth for the machine learning process 170, prior to tagging. A ground truth of the one or more ground truth has an utterance and an intent. In other embodiments of the present invention, the NLC trainer 130 may generate the tagged ground truths by tagging the one or more ground truths while generating the ground truths.

The utterance of the ground truth is a speech/text presented by the users, and the intent is what the users wish to achieve by the utterance, which labels the utterance. Often, the association between the utterance and the intent may be unclear as the same utterance may have more than one meanings. For example, one ground truth may have an instance of utterance "I want apple", by which the user intends to find information on Apple-brand electronic devices. By the same utterance, the user may mean to find information on edible products having apple fruit as an ingredient.

A tagged ground truth 150 of the one or more tagged ground truth includes an utterance 151, a context tag 152, and an intent 153. Similar to conventional ground truth, the utterance 151 of the tagged ground truth 150 is a speech/text presented by the users requesting a response, and the intent 153 of the tagged ground truth 150 is what the users wish to achieve by the utterance 151. Also similar to conventional ground truth, the intent 153 may be a label and/or a classifier for the utterance 151 of the tagged ground truth 150. The context tag 152 of the tagged ground truth 150 is a mark indicating a context of user interaction in which the users submits the utterance 151 to the NLC 120. For example, a user may submit an instance of utterance "I want apple"

while browsing electronics department, in between searching for a mobile phone and a smart watch, and/or immediately after looking up locations for Apple-brand electronics store. According to the circumstances of user interaction, the ground truth contextualizer 140 may tag the utterance with a context tag "Electronics" and classify the utterance into intent "seeking information on Apple-brand electronic devices", and respond accordingly. Similarly wherein another user submits the same utterance "I want apple" while browsing fresh produce department, looking for grocery stores, food items, and/or fruit varieties, the ground truth contextualizer 140 may tag the utterance with a context tag "Fruit", classify the utterance into another instance of intent "seeking information on apple fruit" and respond accordingly. Based on the type of requests made from the utterance, the context tag 152 may be parameters of, including but not limited to, a department in a domain, a price range of a product, one or more preferred brands, colors, targeted age groups, and other various features of merchandises, etc.

The machine learning process 170 learns the NLC training data 137 including the one or more tagged ground truth such that the NLC 120 would accurately classify utterances into respectively corresponding intents by disambiguating the utterances based on respective contexts as represented in respective context tags of the one or more tagged ground truth of the NLC training data 137. Accordingly, even a new context that had not been previously reflected into contexts of the tagged ground truths may be accurately classified by use of semantic approximation. For example, wherein only "Electronics" and "Fruit" context tags exist for tagging ground truths, if a user is browsing a new bakery department and submits the same utterance "I want apple", then the context tag "Fruit" may be applied as fruit as being edible item would more semantically proximate to apple fruits than Apple-brand electronics, and accordingly, the intent would be scaled to "I want to buy apple fruits" and the query may be responded with baked goods and/or food item having apple as an ingredient such as caramel apple, apple strudel, apple pie, etc.

By utilizing the context tag 152, the NLC 120 may properly classify utterances without migration even when a domain originating the utterance 151, for example the domain A 101, evolves into a new environment. For example, when a department named Bakery is newly created additional to Fruits and Electronics relevant to the utterance "I prefer Apple", the natural language classification of the machine learning process associates the Bakery department with the context tag of "Fruits" rather than "Electronics", because Bakery and Fruits are more closely related in semantics than Bakery and Electronics. With conventional natural language classification models, user requests need to be associated to a certain intent by a rules engine to properly classify an utterance, and to classify the utterance properly in a new environment, the rules engine needs to be updated, and the ground truths from an old environment may not be usable in the new environment, even for the same domain.

Figure 2:
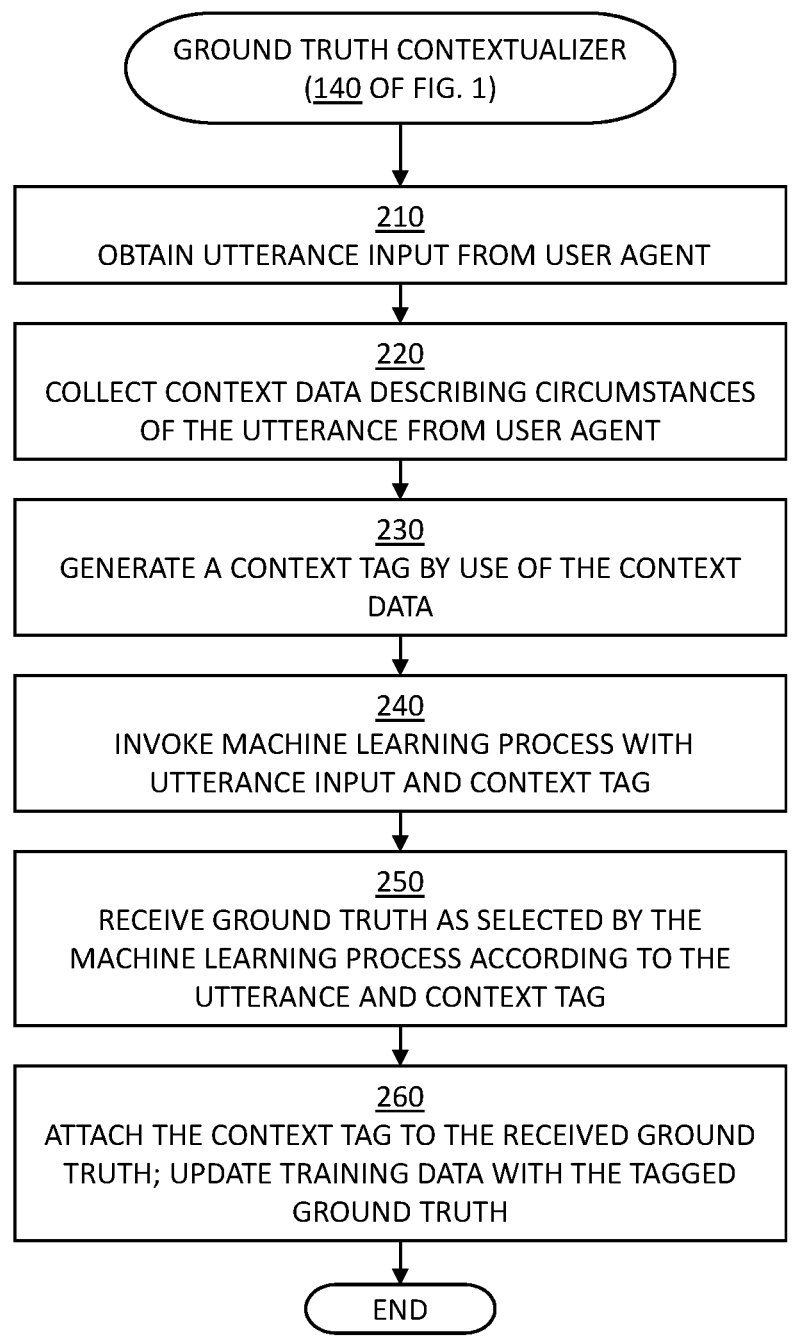
FIG. 2 depicts a flowchart performed by the ground truth contextualizer of the system, in accordance with one or more embodiments set forth herein.

FIG. 2 depicts a flowchart performed by the ground truth contextualizer 140 of FIG. 1, in accordance with one or more embodiments set forth herein.

Prior to block 210, the NLC training data 137 may include ground truths with respective elements of utterance and intent by use of conventional ground truth building mechanism.

In block 210, the ground truth contextualizer 140 obtains utterance input from a user agent representing a user. The utterance input is in a preconfigured length, mostly a full sentence for training the NLC. Then the ground truth contextualizer 140 proceeds with block 220.

In block 220, the ground truth contextualizer 140 collects context data from the user agent. The context data describes circumstances of the utterance obtained in block 210. Then the ground truth contextualizer 140 proceeds with block 230.

In certain embodiments of the present invention, the ground truth contextualizer 140 collects the context data from the user agent. The context data of the utterance input may include a manual input by an authorized administration such as subject matter experts (SMEs). The context data of the utterance input may further include metadata including a hierarchical category of the webpage, as automatically attached by an enterprise application program through which the user agent accesses the NLC. The context data of the utterance input may be a combinations of the manual input and/or the page metadata, pursuant to configuration of the ground truth contextualizer 140. For example, wherein the user agent accesses the NLC from a retail web site, the context data may include, login information of the user, wish lists and/or transaction data of the user, a page information from which the user inputs the utterance such as department and/or product class/type, previous search terms and search details as selected by the user, etc.

In block 230, the ground truth contextualizer 140 generates one or more context tag by use of the context data collected from block 230. A context data describes circumstances of the utterance obtained in block 210. The ground truth contextualizer 140 may generate a context tag by selecting from predefined intents for the utterance input, or by utilizing a specific type of context data, etc. Then the ground truth contextualizer 140 proceeds with block 240.

In block 240, the ground truth contextualizer 140 invokes the machine learning process of the NLC with the utterance input from block 210 and the context tag from block 230. Then the ground truth contextualizer 140 proceeds with block 250.

The machine learning process associates the utterance and the context tag inputs into a ground truth having an intent that is most applicable to the utterance and the context tag. The utterance of the ground truth is semantically identical to the utterance input from block 210, and the intent of the ground truth is semantically consistent/relevant/identical with the context tag from block 230.

In block 250, the ground truth contextualizer 140 receives one or more ground truth from the machine learning process. The one or more ground truth is selected by the machine learning process pursuant to the utterance and the context tag as provided. The one or more ground truth includes respective intent most consistent with the utterance input and the context tag. Then the ground truth contextualizer 140 proceeds with block 260.

In block 260, the ground truth contextualizer 140 attaches the context tag generated from block 230 to the one or more ground truth received from block 250. The ground truth contextualizer 140 updates the training data of the NLC with the ground truth as tagged with the context tag. The updated training data with the tagged ground truths would propagate the context tag information to the machine learning process such that later utterance inputs may be efficiently disambiguated by use of the context tag information. Then the ground truth contextualizer 140 terminates processing the input from block 210.

Certain embodiments of the present invention may offer various technical computing advantages, including automated ground truth disambiguation and elimination of a need for a rules engine in machine learning by use of the context tag categorizing an intent of each ground truth. Accordingly, certain embodiments of the present invention improve the efficiency of natural language classification tasks and the machine learning process of the natural language classification is amplified. Particularly, where the environment of domains using the natural language classification service has been changed, the natural language classification may adapt to the new environment by assimilating the new environment to the semantics of the existing context tags, and accordingly, without any migration effort for the new environment. Certain embodiments of the present invention may be implemented by use of a cloud platform/data center, and the NLC training data may be provided as a subscribed service for organizational clients seeking to improve the efficiency in natural language classification process by machine learning, etc.

Figure 3:
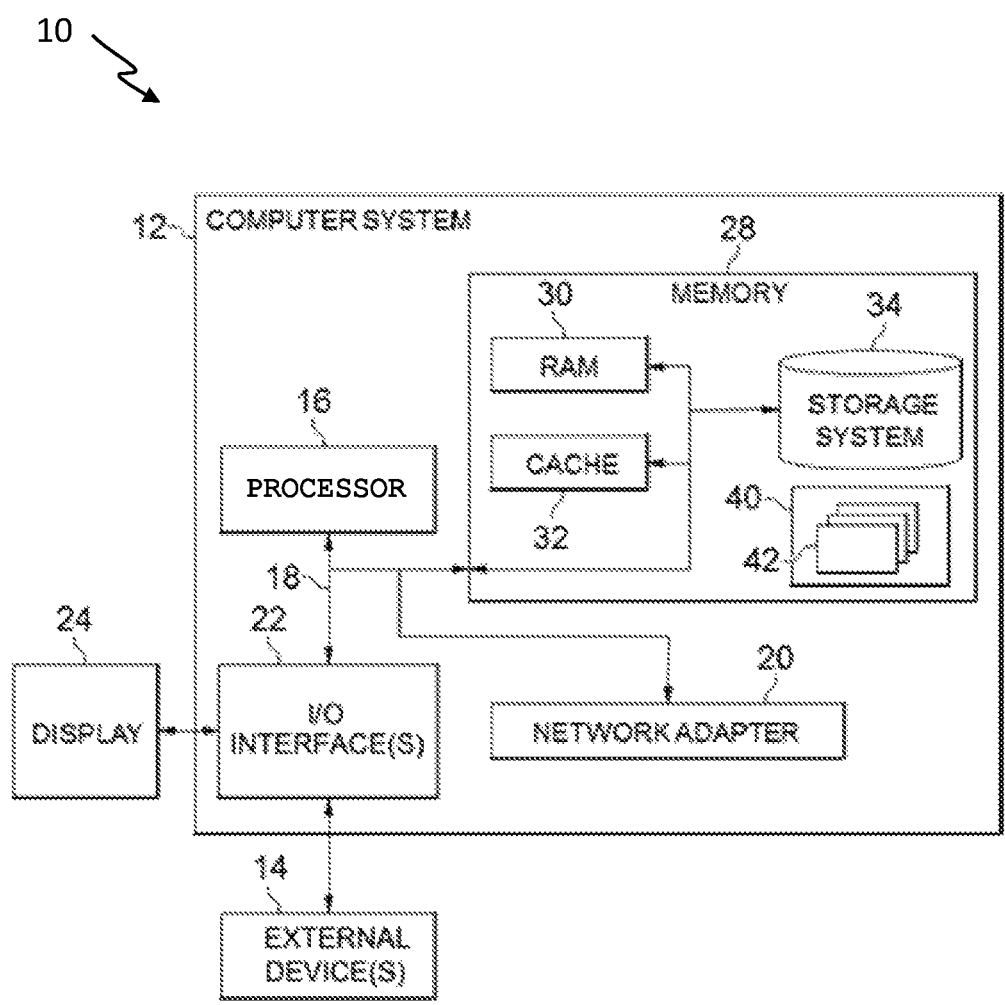
FIG. 3 depicts a cloud computing node according to an embodiment of the present invention.
Figure 4:
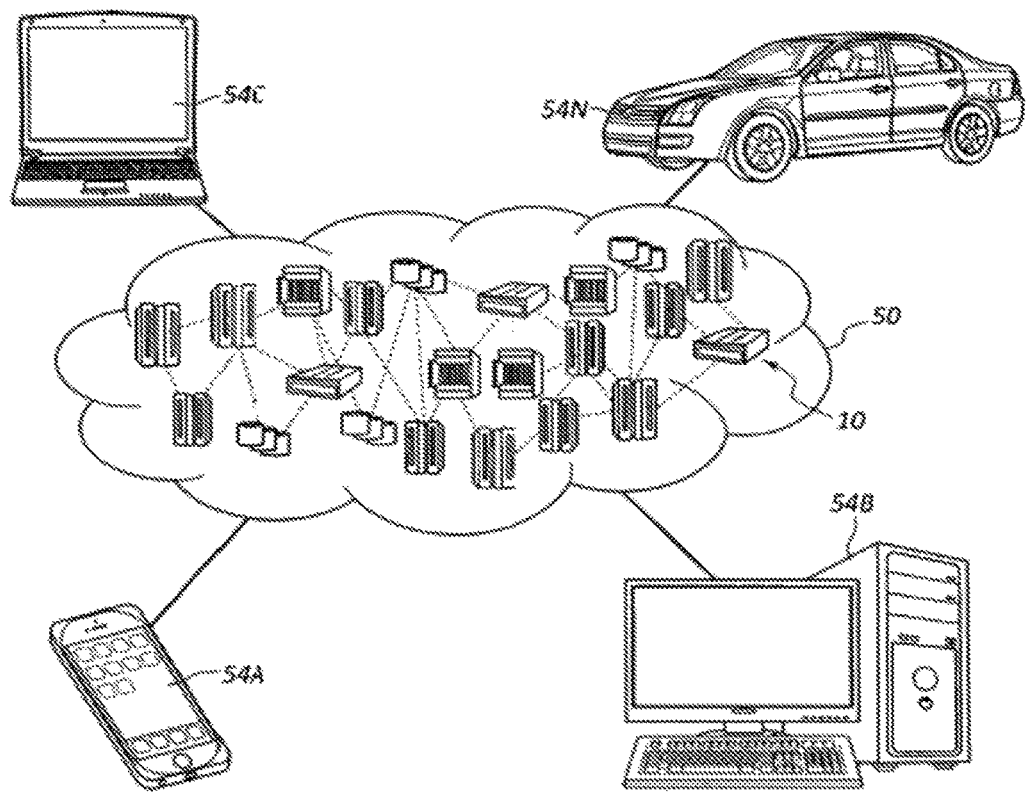
FIG. 4 depicts a cloud computing environment according to an embodiment of the present invention.
Figure 5:
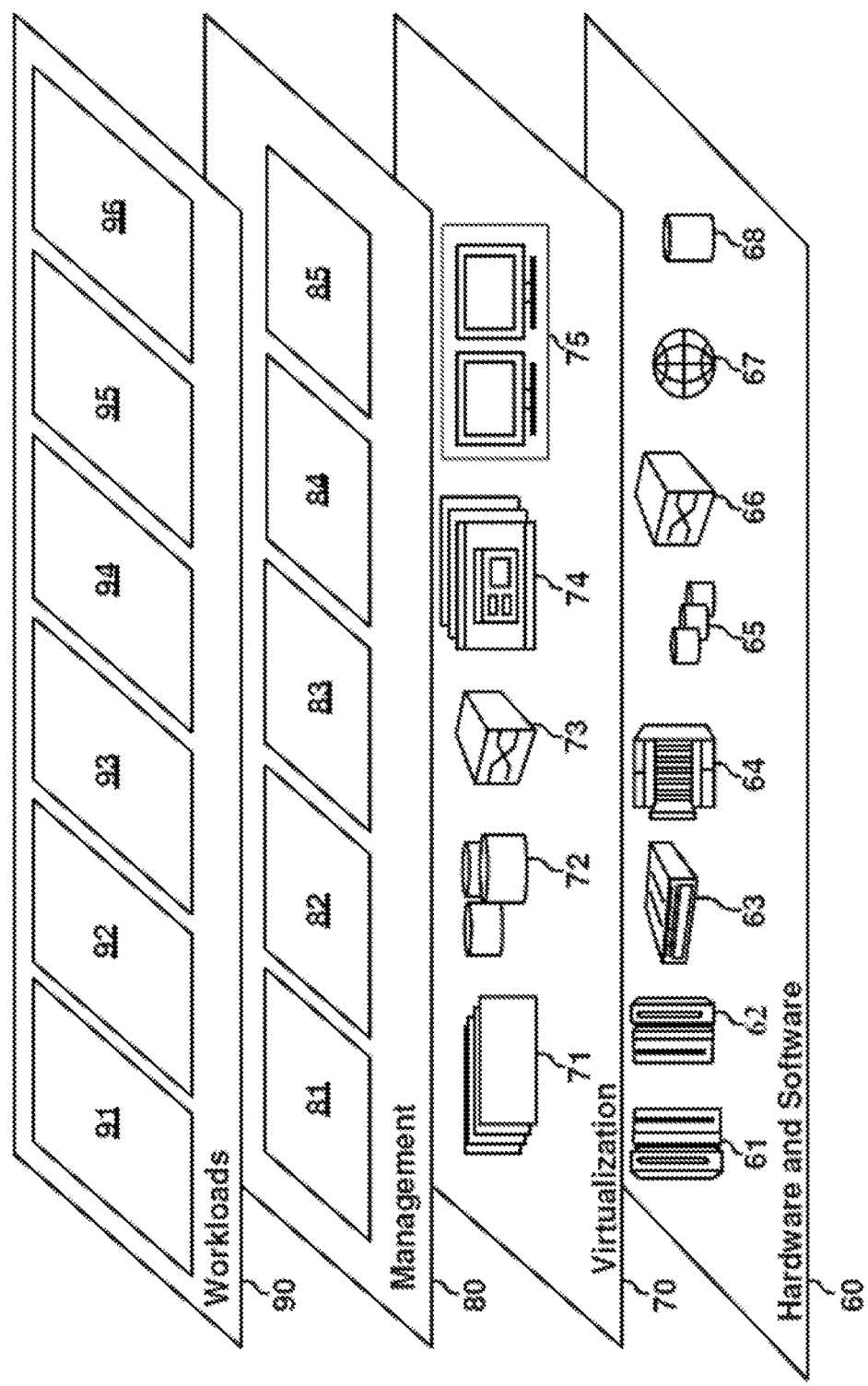
FIG. 5 depicts abstraction model layers according to an embodiment of the present invention.

FIGS. 3-5 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 3, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the natural language classification engine (NLC) 120 of FIG. 1. Program processes 42, as in the NLC trainer 130 and the machine learning process 170 of FIG. 1, respectively, generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the NLC trainer 96, as described herein. The processing components 96 can be understood as one or more program 40 described in FIG. 4.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method for disambiguating training data in natural language classification (NLC), comprising:

obtaining, by one or more processor of a computer, an utterance input from a user agent;

collecting, by the one or more processor, context data of the utterance input from the user agent, wherein the context data describes circumstances of the utterance input;

generating, by the one or more processor, a context tag of one or more context tag based on the context data, wherein the one or more context tag corresponds to the utterance input;

selecting, by the one or more processor, one or more ground truth from the training data by use of the utterance input and the context tag, wherein each of the one or more ground truth respectively includes an utterance and an intent, wherein the utterance of each ground truth is semantically identical to the utterance input, and wherein the intent of each ground truth is semantically consistent with the context tag; and updating, by the one or more processor, the one or more ground truth by attaching the context tag, wherein the selecting is performed by invoking a machine learning process with the utterance input and the context tag so that the machine learning process provides a first ground truth having a first utterance and a first intent, wherein the updating the one or more ground truth by attaching the context tag includes updating the first ground truth so that the first ground truth includes the context tag, and training the machine learning process using first training data, wherein the first training data used to train the machine learning process includes the first ground truth tagged with the context tag and having the first utterance and the first intent.

2. The computer implemented method of claim 1, wherein the context data of the utterance input is selected from the group consisting of: a manual input, metadata of a page from which the utterance input has been provided, and login information of a user.

3. The computer implemented method of claim 1, wherein the user agent runs in a retail website, and wherein the context data of the utterance is selected from the group consisting of: a department name of a page from which the utterance input has been provided, a product type of the page, previous search terms used by a user, and search details selected by the user.

4. The computer implemented method of claim 1, the generating comprising: selecting an instance from the context data for the context tag, wherein the instance is associated with a first intent of the utterance input, wherein the instance distinguishes the first intent from a second intent, wherein the utterance input means both the first intent and the second intent; and assigning the context tag for the utterance input with the instance.

5. The computer implemented method of claim 1, the selecting comprising:

discovering one or more ground truth that has respective utterance identical to the utterance input; ascertaining that an intent of a first ground truth from the discovering is semantically relevant to the context tag by examining respective intent of the one or more ground truth from the discovering; and determining the first ground truth as a ground truth corresponding to the utterance input and the context tag.

6. The computer implemented method of claim 1, wherein the selecting is performed by use of a machine learning process.

7. The computer implemented method of claim 1, wherein a ground truth of the one or more ground truth from the updating includes an utterance, the context tag, and an intent, such that the ground truth disambiguate the utterance according to the context tag and such that the intent of the ground truth is utilized to interpret the utterance input that is identical to the utterance of the ground truth.

8. A computer program product comprising:
a computer readable storage medium readable by one or more processor and storing instructions for execution by the one or more processor for performing a method for disambiguating training data in natural language classification, comprising:
obtaining an utterance input from a user agent;
collecting context data of the utterance input from the user agent, wherein the context data describes circumstances of the utterance input;
generating a context tag of one or more context tag based on the context data, wherein the one or more context tag corresponds to the utterance input;
selecting one or more ground truth from the training data by use of the utterance input and the context tag, wherein each of the one or more ground truth respectively includes an utterance and an intent, wherein the utterance of each ground truth is semantically identical to the utterance input, and wherein the intent of each ground truth is semantically consistent with the context tag; and
updating the one or more ground truth by attaching the context tag, wherein the selecting is performed by invoking a machine learning process with the utterance input and the context tag so that the machine learning process provides a first ground truth having a first utterance and a first intent, wherein the updating the one or more ground truth by attaching the context tag includes updating the first ground truth so that the first ground truth includes the context tag, and training the machine learning process using first training data, wherein the first training data used to train the machine learning process includes the first ground truth tagged with the context tag and having the first utterance and the first intent.

9. The computer program product of claim 8, wherein the context data of the utterance input is selected from the group consisting of: a manual input, metadata of a page from which the utterance input has been provided, and login information of a user.

10. The computer program product of claim 8, wherein the user agent runs in a retail website, and wherein the context data of the utterance is selected from the group consisting of: a department name of a page from which the utterance input has been provided, a product type of the page, previous search terms used by a user, and search details selected by the user.

11. The computer program product of claim 8, the generating comprising: selecting an instance from the context data for the context tag, wherein the instance is associated with a first intent of the utterance input, wherein the instance distinguishes the first intent from a second intent, wherein the utterance input means both the first intent and the second intent; and assigning the context tag for the utterance input with the instance.

12. The computer program product of claim 8, the selecting comprising:
discovering one or more ground truth that has respective utterance identical to the utterance input; ascertaining that an intent of a first ground truth from the discovering is semantically relevant to the context tag by examining respective intent of the one or more ground truth from the discovering; and determining the first ground truth as a ground truth corresponding to the utterance input and the context tag.

13. The computer program product of claim 8, wherein the selecting is performed by use of a machine learning process.

14. The computer program product of claim 8, wherein a ground truth of the one or more ground truth from the updating includes an utterance, the context tag, and an intent, such that the ground truth disambiguate the utterance according to the context tag and such that the intent of the ground truth is utilized to interpret the utterance input that is identical to the utterance of the ground truth.

15. A system comprising:
a memory;
one or more processor in communication with the memory; and
program instructions executable by the one or more processor via the memory to perform a method for disambiguating training data in natural language classification, comprising:
obtaining an utterance input from a user agent;
collecting context data of the utterance input from the user agent, wherein the context data describes circumstances of the utterance input;
generating a context tag of one or more context tag based on the context data, wherein the one or more context tag corresponds to the utterance input;
selecting one or more ground truth from the training data by use of the utterance input and the context tag, wherein each of the one or more ground truth respectively includes an utterance and an intent, wherein the utterance of each ground truth is semantically identical to the utterance input, and wherein the intent of each ground truth is semantically consistent with the context tag; and
updating the one or more ground truth by attaching the context tag, wherein the selecting is performed by invoking a machine learning process with the utterance input and the context tag so that the machine learning process provides a first ground truth having a first utterance and a first intent, wherein the updating the one or more ground truth by attaching the context tag includes updating the first ground truth so that the first ground truth includes the context tag, and training the machine learning process using first training data, wherein the first training data used to train the machine learning process includes the first ground truth tagged with the context tag and having the first utterance and the first intent.

16. The computer implemented method of claim 1, wherein the context data is absent of data derived from the utterance input.

17. The computer implemented method of claim 1, wherein the context data is absent of data derived from the utterance input, and wherein the context data of the utterance includes manually input data, metadata of a page from which the utterance input has been provided, and login information of a user.

18. The computer implemented method of claim 1, further including updating the training data of the NLC so that the training data of the NLC includes the one or more ground truth as tagged with the context tag.

19. The computer implemented method of claim 1, wherein the context data is absent of data derived from the utterance input, and wherein the context data of the utterance includes manually input data, metadata of a page from which the utterance input has been provided, and login information of a user,
   wherein the user agent runs in a retail website, and wherein the context data of the utterance includes a department name of a page from which the utterance input has been provided, a product type of the page, previous search terms used by a user, and search details selected by the user,
   wherein the generating comprises selecting an instance from the context data for the context tag, wherein the instance is associated with a first intent of the utterance input, wherein the instance distinguishes the first intent from a second intent, wherein the utterance input means both the first intent and the second intent, and assigning the context tag for the utterance input with the instance,
   wherein the selecting comprises discovering one or more ground truth that has respective utterance identical to the utterance input, ascertaining that an intent of a certain ground truth from the discovering is semantically relevant to the context tag by examining respective intent of the one or more ground truth from the discovering, and determining the certain ground truth as a ground truth corresponding to the utterance input and the context tag.

* * * * *